Nov. 26, 1940.  J. MANTELET  2,222,927
MILL FOR GRINDING PEPPER, SALT, SUGAR, COFFEE, AND THE LIKE
Filed July 23, 1937
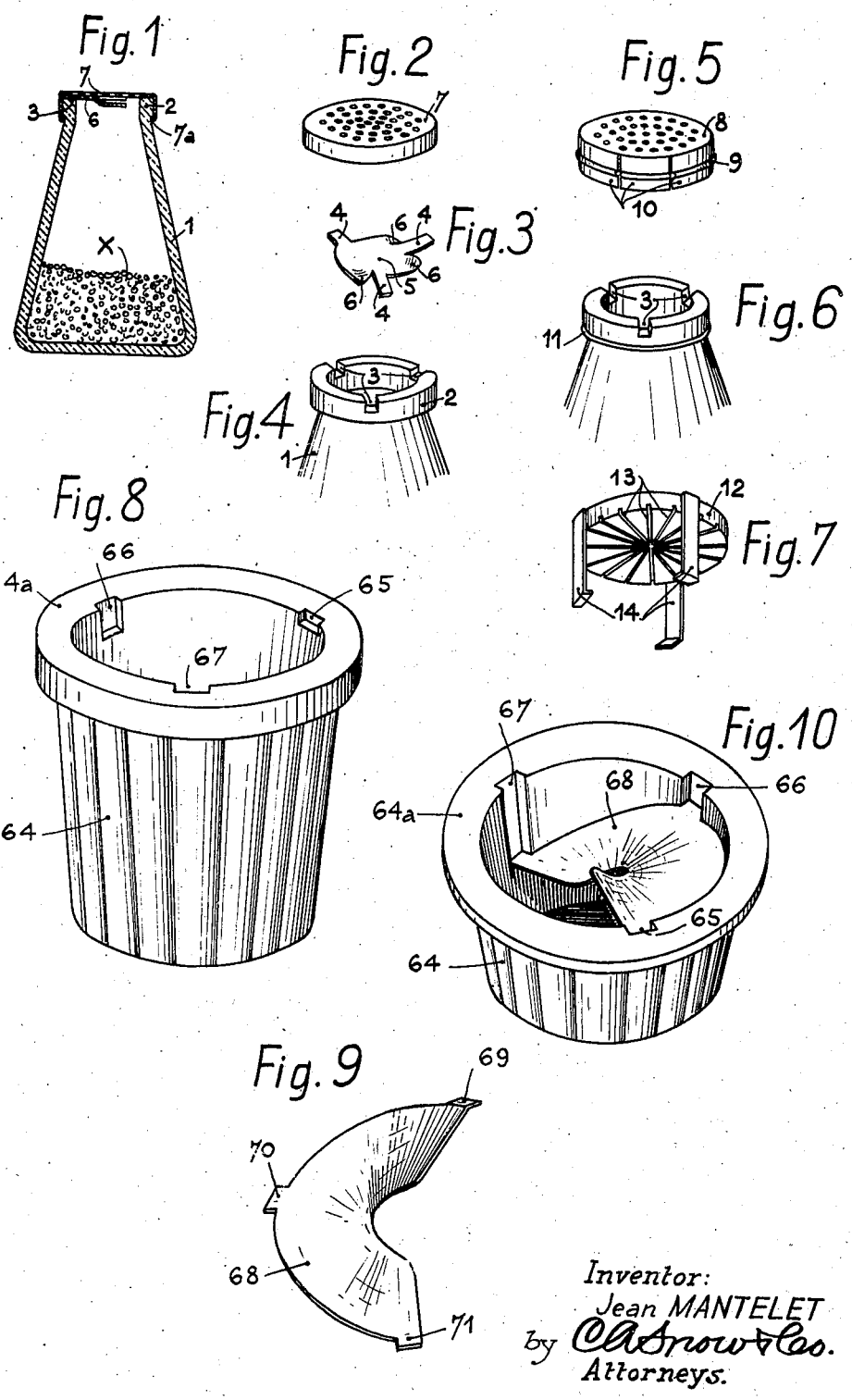
Inventor:
Jean MANTELET
by CASnow&Co.
Attorneys.

Patented Nov. 26, 1940

2,222,927

UNITED STATES PATENT OFFICE 2,222,927

MILL FOR GRINDING PEPPER, SALT, SUGAR, COFFEE, AND THE LIKE

Jean Mantelet, Bagnolet, France, assignor to Mantelet & Boucher (Societe en nom collectif), Bagnolet (Seine), France Application July 23, 1937, Serial No. 155,338
In Luxemburg, August 18, 1936

3 Claims. (Cl. 83—13)

My invention relates to an improved mill for grinding pepper, salt, sugar, coffee and the like.

According to the present invention, the improved mill comprises a receptacle adapted to contain the matter to be subdivided, a removable crushing member carried by the receptacle in a fixed angular position and a cover closing the opening of said receptacle and rotatably mounted relatively to said receptacle, said cover forming simultaneously a cooperating crushing member securing the parcellation of the matter to be subdivided and a delivery member for the powdered matter.

Some embodiments of my invention are represented by way of examples in the accompanying drawing in which:

Fig. 1 shows in axial section a pepper mill made according to the invention.

Fig. 2 shows in perspective view a lid or cover forming a sieve and adapted to be fixedly secured to the receptacle.

Fig. 3 is a perspective view of a crushing member with multiple helical blades.

Fig. 4 shows in perspective view the upper part of the receptacle.

Figs. 5 and 6 show respectively in perspective views a removable cover forming a sieve and the upper part of the receptacle.

Fig. 7 shows in perspective view a cover acting as a distributor.

Fig. 8 is a perspective view of another embodiment of my invention showing the receptacle only.

Fig. 9 shows the removable helical crushing member and Fig. 10 shows said crushing member mounted in the receptacle.

The mill which is represented in Figs. 1 to 4 comprises a receptacle 1 the orifice of which forms a cylindrical flange 2 projecting from the body of the receptacle and provided on its edge with a certain number of radial notches adapted to receive the projecting lugs 4 from a crushing member 5. The latter is constituted here by three parts of helical surface 6 the upper edges of which are flush with the orifice of the receptacle (Fig. 1).

When the receptacle is filled with the material to be subdivided, peppercorns X for instance, the orifice of same is closed by a cover or lid 7 acting as a sieve, the lower edge of which is turned down at 7a beneath the flange 2 so as to allow the same to revolve freely but to prevent the same from being removed. The mill constitutes a waste packing of the material to be subdivided.

The operation of same is as follows:

The user, after having turned over the receptacle, immobilizes by hand the cover and causes the receptacle to rotate, (he could of course immobilize the receptacle and cause the cover to rotate); the corns are then ground between the helical crushing members and the cover and flow in a pulverulent state through the holes of the sieve.

The mill represented in Figs. 5 and 6 comprises a removable cover or lid 8 acting as a sieve, the edge of which so flanged as to form a groove 9, is cut at several places over the whole of its height and forms a certain number of tongues 10 capable of resiliently moving apart so as to adapt itself upon the orifice of the receptacle; the groove 9 snugly fits itself over a flange 11 of the receptacle, thereby securing a removable closure whilst allowing the cover to revolve.

It will be observed that the cover of the receptacle does not necessarily constitute a sieve; in Fig. 7, the cover 12, made of plastic material for example, is provided with radial grooves 13, whilst resilient lugs 14, engaging themselves under the flange 2 of the receptacle, secure the rotary fastening of same.

Fig. 8 shows a receptacle 64 provided with an upper flange 64a adapted to allow of the lower edge of a dispensing cover, not shown, to be turned down beneath said flange so as to allow the same to revolve freely.

In the inner wall of the receptacle are disposed three longitudinal grooves 65, 66, 67, the respective heights of which are progressively increasing. The crushing member adapted to cooperate with the cover not shown in order to secure the parcellation of the matter to be subdivided, is constituted by an ascending slope 68 having the shape of a helical surface and provided with three peripheral lugs 69, 70, 71, adapted to lean themselves respectively on the bottom of grooves 65, 66, 67. Said grooves which carry the crushing member prevent itself from being rotated.

The part of the receptacle which is located under the crushing member forms a store room for the matter to be subdivided.

While I have described what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim is:

1. In a device of the type described, comprising an open container and a rotatable distributing cover over the container opening, a stationary crushing member on the underside of said cover, consisting of a single sheet metal part shaped into at least one helical portion having a radial scraping edge adjacent said cover and a lug formed by a radial extension of the marginal member portion adjacent said edge and at least two other lugs, peripherally spaced from each other and from the first named lug, the container wall being formed, adjacent said opening, with recesses, open at their upper ends and providing bottom surfaces at their lower ends, for accommodating and axially supporting on their said bottom surfaces the respective lugs of said member, thereby to prevent said member from rotating and to hold same in frictional engagement with said cover, and means for retaining said cover on the container independently of said member.

2. In a device of the type described, comprising an open container and a rotatable distributing cover over the container opening, a stationary crushing member on the underside of said cover, consisting of a single sheet metal part shaped into at least three peripherally displaced helical portions each having a radial scraping edge adjacent said cover and a lug formed by a radial extension of the marginal member portion adjacent said edge, the container wall being formed, adjacent said opening, with recesses, open at their upper ends and providing bottom surfaces at their lower ends, for accommodating and axially supporting on their said bottom surfaces the respective lugs of said member, thereby to prevent said member from rotating and hold same in frictional engagement with said cover, and means for retaining said cover on the container independently of said member.

3. In a device of the type described, comprising an open container and a rotatable distributing cover over the container opening, a stationary crushing member on the underside of said cover, consisting of a single sheet metal part shaped into one helical portion having a helical outer edge and formed with at least three peripherally spaced lugs projecting radially from said edge, the container wall being formed, adjacent said opening, with recesses, open at their upper ends and providing bottom surfaces at their lower ends at different levels, for accommodating and axially supporting on their said bottom surfaces the respective lugs of said member at their respective levels, thereby to prevent said member from rotating and hold same in frictional engagement with said cover, and means for retaining said cover on the container independently of said member.

JEAN MANTELET.